US008239939B2

(12) United States Patent
Dunagan et al.

(10) Patent No.: US 8,239,939 B2
(45) Date of Patent: Aug. 7, 2012

(54) BROWSER PROTECTION MODULE

(75) Inventors: John Dunagan, Sammamish, WA (US);
Opher Dubrovsky, Redmond, WA (US);
Saher Esmeir, Redmond, WA (US);
Charles S Reis, Redmond, WA (US);
Jiahe Helen Wang, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 946 days.

(21) Appl. No.: 11/426,785

(22) Filed: Jun. 27, 2006

(65) Prior Publication Data
US 2007/0016949 A1 Jan. 18, 2007

Related U.S. Application Data

(63) Continuation-in-part of application No. 11/183,329, filed on Jul. 15, 2005.

(60) Provisional application No. 60/743,373, filed on Feb. 28, 2006.

(51) Int. Cl.
*H04L 29/06* (2006.01)
*G06F 12/14* (2006.01)

(52) U.S. Cl. .......... 726/22; 713/161; 713/187; 713/188; 726/2; 726/11; 726/23; 726/25; 726/14; 705/28; 705/38; 705/80; 715/778; 715/765

(58) Field of Classification Search .................. 726/11, 726/22–25; 713/165
See application file for complete search history.

(56) References Cited

U.S. PATENT DOCUMENTS

| 5,659,539 | A | 8/1997 | Porter et al. | |
| 5,675,762 | A | 10/1997 | Bodin et al. | |
| 6,076,109 | A | 6/2000 | Kikinis | |
| 6,253,326 | B1 * | 6/2001 | Lincke et al. | 726/12 |
| 6,266,681 | B1 | 7/2001 | Guthrie | |
| 6,275,937 | B1 | 8/2001 | Hailpern et al. | |
| 6,553,410 | B2 | 4/2003 | Kikinis | |
| 6,711,675 | B1 * | 3/2004 | Spiegel et al. | 713/2 |
| 6,920,560 | B2 * | 7/2005 | Wallace, Jr. | 713/168 |
| 7,155,737 | B1 * | 12/2006 | Lim et al. | 726/2 |
| 7,159,237 | B2 * | 1/2007 | Schneier et al. | 726/3 |
| 7,188,363 | B1 * | 3/2007 | Boutros et al. | 726/13 |

(Continued)

FOREIGN PATENT DOCUMENTS

JP 11167487 6/1999

(Continued)

OTHER PUBLICATIONS

Dahlia Malkhi, Secure execution of Java applets using a remote playground, Dec. 2000, IEEE, vol. 26, pp. 3-10.*

(Continued)

*Primary Examiner* — Syed A. Zia
*Assistant Examiner* — Viral Lakhia
(74) *Attorney, Agent, or Firm* — Lee & Hayes, PLLC

(57) ABSTRACT

An exemplary computer-implementable method (300) transforms information to reduce or eliminate risk of exploitation of a software service and includes receiving information (304) in response to a request, transforming the information (308) to produce transformed information and sending the transformed information (312). An exemplary firewall server (112) includes server software (144, 148) that allows the firewall server (112) to receive information from a resource (104, 108) via a network and to send information to a client computer (114) and a browser protection component (264, 268) for transforming the information to prevent exploitation of a vulnerability of browser software (154) on the client computer (114). Various other exemplary methods, devices, systems, etc., are also disclosed.

16 Claims, 4 Drawing Sheets

U.S. PATENT DOCUMENTS

| | | | |
|---|---|---|---|
| 7,191,252 B2* | 3/2007 | Redlich et al. | 709/246 |
| 7,194,744 B2* | 3/2007 | Srivastava et al. | 719/331 |
| 7,263,561 B1 | 8/2007 | Green et al. | |
| 7,392,545 B1* | 6/2008 | Weber et al. | 726/25 |
| 7,398,533 B1* | 7/2008 | Slaughter et al. | 719/328 |
| 7,620,719 B2* | 11/2009 | Tock et al. | 709/225 |
| 7,640,434 B2 | 12/2009 | Lee et al. | |
| 7,650,638 B1* | 1/2010 | Njemanze et al. | 726/23 |
| 7,904,278 B2* | 3/2011 | Wilson et al. | 702/186 |
| 2002/0010855 A1 | 1/2002 | Reshef et al. | |
| 2002/0073119 A1 | 6/2002 | Richard | |
| 2002/0104023 A1* | 8/2002 | Hewett et al. | 713/201 |
| 2002/0124181 A1 | 9/2002 | Nambu | |
| 2002/0129239 A1* | 9/2002 | Clark | 713/153 |
| 2003/0014659 A1 | 1/2003 | Zhu | |
| 2003/0037261 A1* | 2/2003 | Meffert et al. | 713/201 |
| 2003/0097591 A1 | 5/2003 | Pham et al. | |
| 2003/0163448 A1 | 8/2003 | Kilemba et al. | |
| 2003/0177390 A1* | 9/2003 | Radhakrishnan | 713/201 |
| 2004/0039752 A1 | 2/2004 | Goldfuss, Jr. et al. | |
| 2004/0123137 A1* | 6/2004 | Yodaiken | 713/200 |
| 2004/0123157 A1 | 6/2004 | Alagna et al. | |
| 2004/0151323 A1* | 8/2004 | Olkin et al. | 380/280 |
| 2004/0230825 A1* | 11/2004 | Shepherd et al. | 713/200 |
| 2005/0015752 A1* | 1/2005 | Alpern et al. | 717/131 |
| 2005/0021791 A1 | 1/2005 | Sakiyama et al. | |
| 2005/0066311 A1* | 3/2005 | Hagmeier et al. | 717/128 |
| 2005/0071616 A1* | 3/2005 | Zimmer et al. | 713/1 |
| 2005/0108554 A1 | 5/2005 | Rubin et al. | |
| 2005/0149726 A1* | 7/2005 | Joshi et al. | 713/164 |
| 2005/0154885 A1* | 7/2005 | Viscomi et al. | 713/165 |
| 2005/0182928 A1* | 8/2005 | Kamalanathan et al. | 713/164 |
| 2005/0193329 A1 | 9/2005 | Kickel | |
| 2005/0223413 A1* | 10/2005 | Duggan et al. | 726/3 |
| 2005/0235200 A1 | 10/2005 | Goldberg | |
| 2005/0268214 A1 | 12/2005 | Lu | |
| 2005/0283719 A1 | 12/2005 | Awamoto et al. | |
| 2006/0036746 A1* | 2/2006 | Davis | 709/228 |
| 2006/0041834 A1 | 2/2006 | Chen et al. | |
| 2006/0053411 A1 | 3/2006 | Takamiya | |
| 2007/0011744 A1 | 1/2007 | Carothers et al. | |
| 2007/0016948 A1* | 1/2007 | Dubrovsky et al. | 726/22 |
| 2007/0016949 A1 | 1/2007 | Dunagan et al. | |
| 2007/0113282 A1* | 5/2007 | Ross | 726/22 |
| 2009/0183171 A1* | 7/2009 | Isaacs et al. | 719/311 |

FOREIGN PATENT DOCUMENTS

| | | |
|---|---|---|
| JP | 2002290900 | 10/2002 |
| JP | 2004318816 | 11/2004 |
| WO | WO0213026 A1 | 2/2002 |
| WO | WO2004077294 | 9/2004 |

OTHER PUBLICATIONS

Chang, "An Adaptive Distributed Object Framework for the Web" Available at http://osl.cs.uiuc.edu/docs/ecoop-phd04/main.pdf.

Murphy et al., "Securing the Enterprise from Malware Threats" Available at http://www.surfcontrol.com/uploadedfiles/general/white_papers/Malware_Whitepaper.pdf.

Wahbe et al.'Efficient Software-Based Fault Isolation; 1993 ACM SIGOPS; pp. 203-216.

Wang et al., "Shield: Vulnerability-Driven Network Filters for Preventing Known Vulnerability Exploits" Available at http://delivery.acm.org/10.1145/1020000/1015489/p193-wang.pdf?key1=1015489&key2=8156443411&coll=GUIDE&dl=GUIDE&CFID=72316072&CFTOKEN=46175408.

Chen et al., "A Systematic Approach to Uncover Security Flaws in GUI Logic", IEEE Symposium on Security and Privacy, May 2007, 15 pgs.

Howell et al., "MashupOS: Operating System Abstractions for Client Mashups", Proceedings 11th USENIX workshop on Hot Topics in Operating Systems, 2007, 7 pgs.

Wang et al., "Protection and Communication Abstractions for Web Browers in MashupOS", SOSP07, ACM, Oct. 2007, 15 pgs.

Wang et al., "The Multi-Principal OS Construction of the Gazelle Web Browser", Microsoft Research, White Paper, Feb. 2009, 16 pgs.

"Internet-based Content Security Protection in the Net", Internet Citation, 2004, retrieved from the internet at http://www.streamshield.com/resources/whitepapers.php on Dec. 20, 2005.

Martin, et al., "Blocking Java Applets at the Firewall", Proceedings of the Network and Distributed System Security Symposium, San Diego, CA, Feb. 10-11, 1997, IEEE Computer. Soc., pp. 16-26.

Office action for U.S. Appl. No. 11/183,329, mailed on May 19, 2011, Dubrovsky et al., "Immunizing HTML Browsers and Extensions from known Vulnerabilities".

Translated Chinese Office Action mailed Jul. 26, 2011 for Chinese patent application No. 200680025529.2, a counterpart foreign application of U.S. Appl. No. 11/183,329, 11 pages.

European Office Action mailed Oct. 17, 2011 for European patent application No. 06786875.2, a counterpart foreign application of U.S. Appl. No. 11/183,329, 5 pages.

Translated Japanese Office Action mailed Sep. 9, 2011 for Japanese patent application No. 2008-521517, a counterpart foreign application of U.S. Appl. No. 11/183,329, 5 pages.

Office Action for U.S. Appl. No. 11/183,329, mailed on Oct. 24, 2011, Opher Dubrovsky, "Immunizing HTML Browsers and Extensions from known Vulnerabilities", 18 pgs.

* cited by examiner

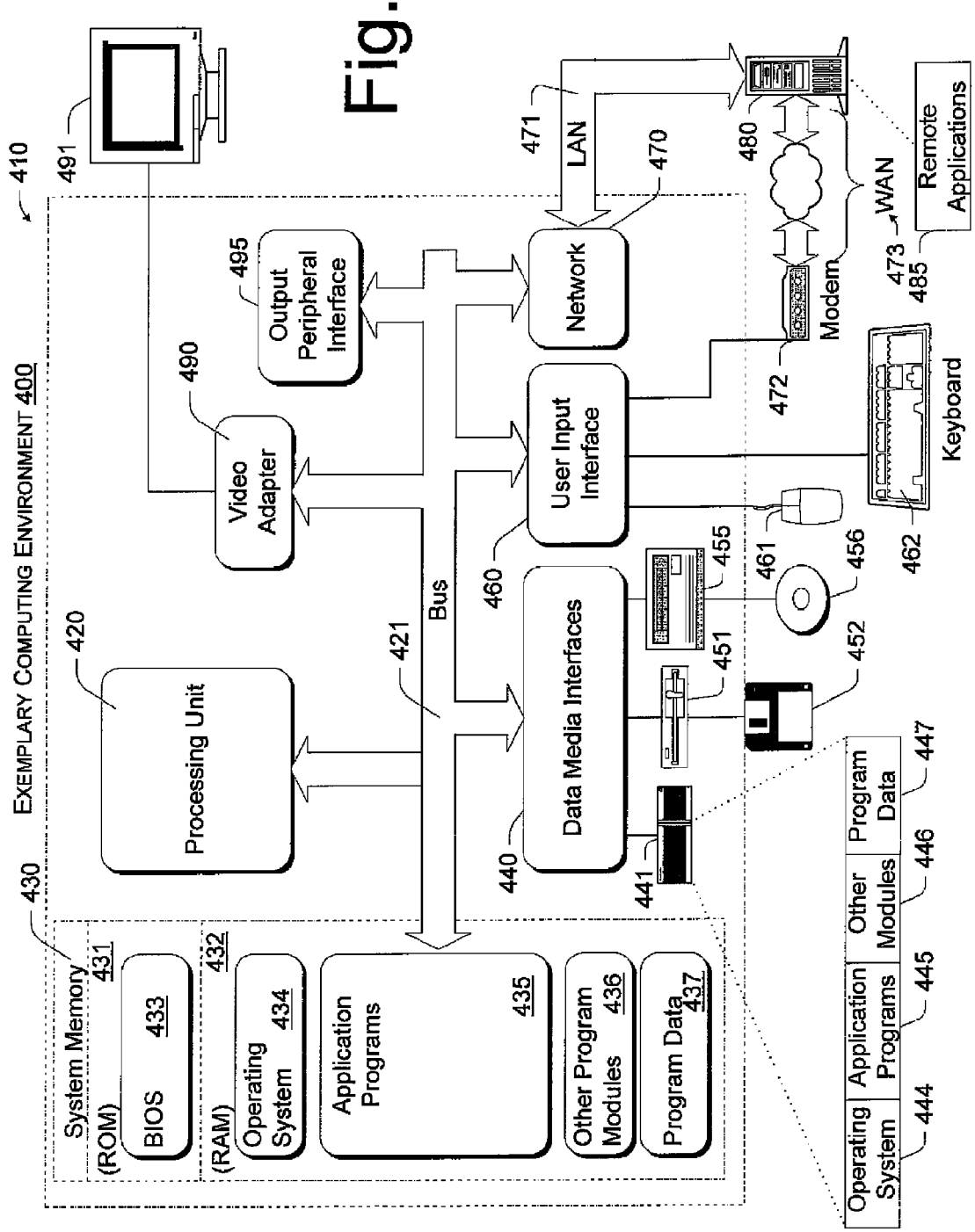

BROWSER PROTECTION MODULE

RELATED APPLICATIONS

This application claims priority to U.S. Provisional Application Ser. No. 60/743,373, entitled "Browser Shield", filed Feb. 28, 2006, which is incorporated by reference herein, and this application is a continuation-in-part application of U.S. patent application Ser. No. 11/183,329, entitled "Immunizing HTML Browsers from Known Vulnerabilities", filed on Jul. 15, 2005, which is incorporated by reference herein.

BACKGROUND

Many recently discovered browser software vulnerabilities are related to code such as HTML code and various script codes (e.g., JavaScript™ (Sun Microsystems, Inc. Santa Clara, Calif.), VISUAL BASIC® script (Microsoft Corporation, Redmond, Wash.)). Patches for such browser vulnerabilities are not always installed quickly, which increases risk of attack. For example, in many cases a user may take weeks or even months to install the latest patches. During this time, the user's software is vulnerable to attacks. Various exemplary technologies disclosed herein address ways to reduce or eliminate risk of attack on or through software services.

FIG. 4 is a diagram of an exemplary computing environment, which may be used to implement various exemplary technologies described herein.

DETAILED DESCRIPTION

Figure 1:
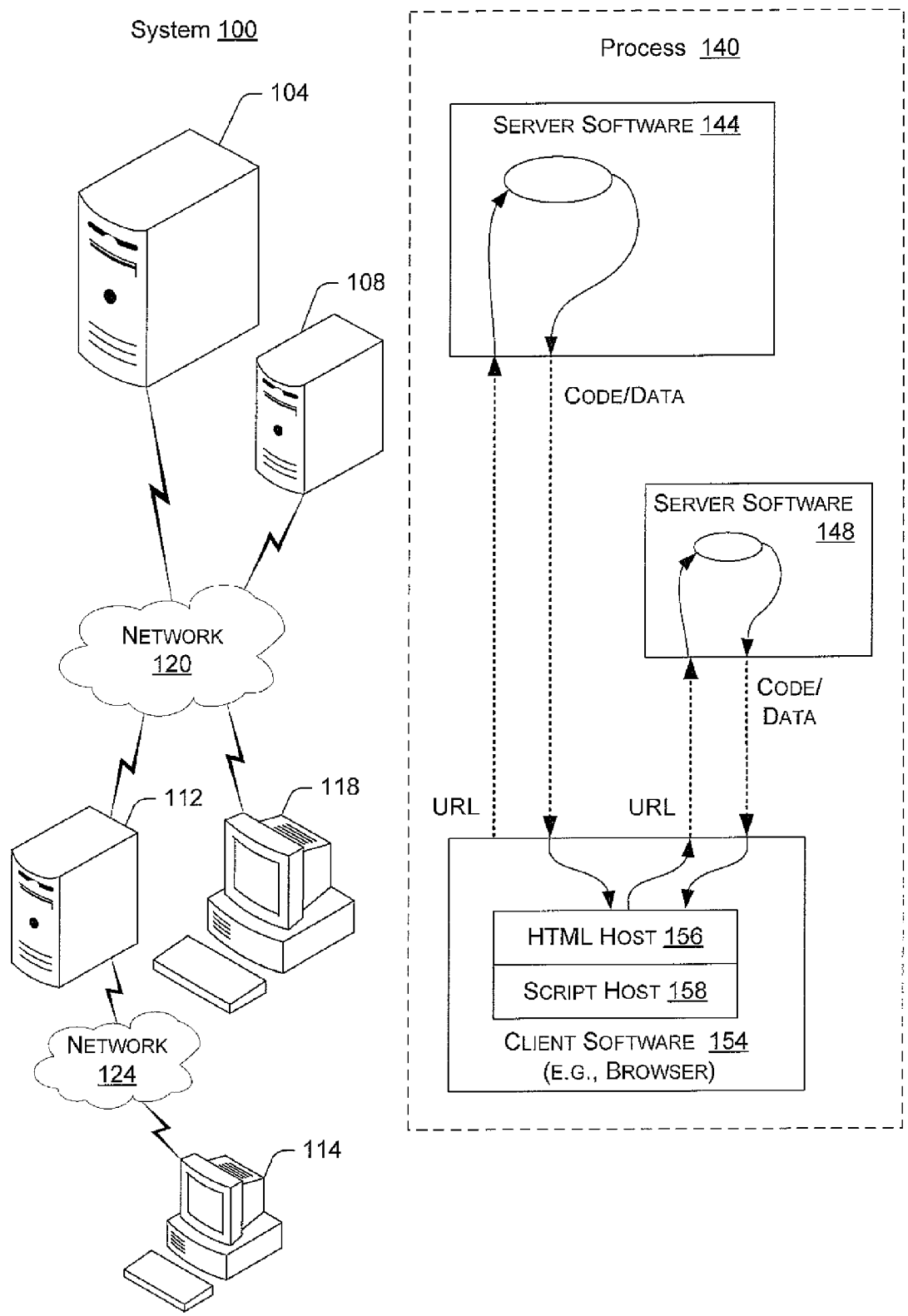
FIG. 1 is a diagram of a system and a process whereby resources may be accessed via one or more networks.

Various exemplary technologies presented herein pertain to browser security and, in particular, to methods that prevent execution of exploits that might be present in HTML pages with script code. Various examples pertain to browser exploits, which may try to exploit underlying resources of a browser. Various technologies can help prevent other types of attacks such as those used in email phishing schemes, which may also rely on browser exploits.

An exemplary browser protection module can achieve various goals associated with browser security. A module may rely on source-to-source translations to transform an unsafe page into a safe page. A safe page prevents exploits while otherwise preserving the original page's semantics.

An exemplary browser protection module can enhance browser security through source-to-source translation of code and optionally associated code (e.g., HTML code, JavaScript™ code, etc.). An exemplary browser protection module may create an isolation layer that prevents a page from directly accessing or modifying a browser's underlying resources (e.g., a browser's internal representation of HTML objects and scripts). An exemplary browser protection module may check behavior of a page's HTML contents and script before rendering or execution of the page can occur.

An exemplary browser protection module may add new scripts to a page that in essence form a virtualization layer that will be executed when the page is loaded into a browser. For example, an exemplary browser protection module can act to insert code (e.g., script, HTML, etc.) into an original page where the inserted code provides isolation (also known as sandboxing) and provides virtualization so that access to the content of the original page is preserved (i.e., accessing the browser's representation of the objects that correspond to the original page), with the caveat that the isolation layer acts as a gatekeeper, and access to logic associated with the inserted code (e.g., browser protection logic) is denied to help ensure that the logic is not altered or tampered with.

The inserted code provides for awareness of any actions (e.g., script actions, HTML actions, etc.) taken by code in the original page as well as runtime variable values (e.g., values that may cause an undesirable action). This inserted code provided by the browser protection module is thus capable of stopping malicious actions, as well as optionally introducing other changes to a page, if such changes are desired or required for safe execution on a target browser or, more generally, a target environment.

Some exemplary browser protection techniques include code to create a virtualization layer for script (e.g, JavaScript™ code, etc.). Such code is optionally in the form of dynamically insertable script that can create a source-to-source program transformer. As already mentioned, changes may be made to a page (e.g., code and/or variables). An exemplary browser protection technique includes code for making such changes (e.g., additions, deletions, revisions, replacements). For example, code may re-write HTML code or JavaScript™ code. Such code may augment virtualization techniques and changed code may be optionally checked using a virtualization layer.

Some terms used in the description follow:
- incoming code: code that originates from outside an exemplary browser protection module. In general, such code is considered unsafe as it may require transformation. Incoming code may be in the form of script code (e.g., JavaScript™ code), mark-up language code (e.g., HTML), or other executable code. Where script code is involved, incoming code may be referred to as incoming script or scripts.
- transformed code: code that is output by an exemplary browser protection module (e.g., HTML or JavaScript™ code) and which has guarantees as to freedom from exploits for known vulnerabilities. Translation is generally a transformation process and, hence, translated code is generally transformed code.
- untransformed code: code (e.g., HTML or JavaScript™ code) present in incoming scripts, before being transformed by an exemplary browser protection module.
- property read: any operation that accesses the value of an object's property.
- property write: any operation that modifies the value of an object's property, such as an assignment.
- virtualization: replacing a given statement or expression with code that performs essentially the same task, except with safety checks and potential modifications to ensure that invariants of an exemplary browser protection module are met. Virtualization may also refer to creation of a virtual environment that mimics that of a target environment, for example, to detect problems before code executes on the target environment or one or more variable values are input on the target environment.
- interposition framework: code of an exemplary browser protection module that conceptually sits between the browser and incoming code, which provides the opportunity to virtualize statements and expressions.
- sandboxing: monitoring the executable actions of potentially malicious code and variables to prevent certain operations from taking place.

isolation: while this term can refer to pinpointing the exact cause and location of a fault or faulty code or faulty variable; it typically refers to restricting code and/or variables, for example, an isolation layer ensures that pages can never directly access or modify their own source, such that all mark-up language contents and script behavior can be checked before rendering or execution. An isolation layer may be created using source-to-source translation of code (e.g., HTML, JavaScript™, etc.). An isolation layer may operate in a manner akin to a sandbox or virtual machine, however, with features and for purposes described herein.

idempotent; For example, C programming language header files are often designed to be idempotent, that is, if the header file is included more than once (as can easily happen with nested #included files), then nothing untoward happens as the effect is the same as if a file had been included only once. Various exemplary browser protection techniques are idempotent (e.g., use idempotent code).

deallocate: a process whereby memory or pointers are no longer allocated to an item such as a data item. An exemplary browser protection module can have a data structure that is automatically deallocated at an appropriate time or upon occurrence of an event.

bound: generally to fix (e.g., by number, by size, etc.). An exemplary browser protection module can have a data structure that is bounded so that an unreasonable amount of memory is not consumed.

abstract syntax tree (AST): a construct representing something which has been parsed, often used as a compiler or interpreters internal representation of a computer program after reading in the program but before executing the program. For JavaScript™ code, an AST typically records input tokens of interest and encodes the structure used to match those tokens, in other words, the tree provides an abstract syntax that represents the code structurally as a tree instead of a sequence of tokens.

Various exemplary browser protection mechanisms can act, more generally, to prevent exploitation of vulnerabilities that exist in software services that take scripts and other data for input operations. With respect to implementation, various exemplary mechanisms can be implemented in association with an interior node of a network (e.g., on an enterprise firewall), an end node (e.g., a client with a software service), etc.

A primary goal of an exemplary browser protection module, as directed to browser applications, is (where reasonably possible) to fully prevent the execution of exploits of known vulnerabilities in web browsers, ensuring there are no false negatives (e.g., missed exploits) or ways to evade the framework (e.g., techniques for causing exploits to be missed). Given that exploits may be present in either mark-up language (e.g., HTML) or script code, and that script code may arbitrarily modify both the page's mark-up language and its own executable code, to achieve this particular goal, an exemplary browser protection module may perform one or more of the following processes: removing all exploits statically from mark-up language and script code, preventing scripts from inserting new exploits directly, preventing scripts from modifying themselves to run unchecked code, and preventing scripts from tampering with the logic of the browser protection module.

With respect to static removal, such removal aims to remove exploits of the first order. For example, first order exploits are those already present in an original page, code, script, etc., and directed to exploiting the browser application (or software service) when the original content is parsed or executed. In contrast, second order exploits are those that have to be generated by the content (e.g., scripts on the page) and, which only after or upon generation, are inserted into the original content (e.g., page) and subsequently executed to create the attack on the browser (or software service).

To minimize disruptions and the possibility of false positives (e.g., pages that should be run but are not), an exemplary browser protection module may include features to maintain compatibility with existing, valid web pages. For example, "legal" pages without exploits are not rejected, and the behavior of such pages, including the evaluation order of statements and expressions, remains unchanged after source translation.

An exemplary browser protection may operate independently of a target client. For example, a browser protection module may run on a firewall/proxy cache such as an Internet Security and Acceleration (ISA) server, to provide greater protection to clients with simple deployment scenarios (e.g., consider the MICROSOFT® ISA Server, which is an advanced stateful packet and application-layer inspection firewall, virtual private network (VPN), and Web cache solution).

An exemplary browser protection module operates on code (e.g., scripts, HTML, etc.) that originate from the web where the module (e.g., implemented through an ISA firewall) reads and modifies, as appropriate, the code and optionally other content. Some scripts may rely on timing considerations for meaningful behavior; a browser protection module may include features for handling such scripts.

Exemplary browser protection technology is optionally incorporated into ISA server software, INTERNET EXPLORER® software, MSN® software (e.g., MSN® Search software) (Microsoft Corporation, Redmond, Wash.), or other software that may communicate or execute code (e.g., HTML, scripts, etc.).

As described below, an exemplary browser protection module may prevent rendering of mark-up language (e.g., HTML) if not inspected for exploits; prevent direct access to DOM objects; prevent JavaScript™ execution if not translated for dynamic security checks; prevent incoming scripts from directly changing themselves; prevent modified JavaScript™ code from accessing other scripts; prevent scripts from directly accessing their actual source; and/or preventing modification of itself or a related component at runtime.

Exemplary virtualization techniques may be optionally used for sanitizing searching and browsing actions and optionally for protecting against other malicious actions like phishing attacks (e.g., attempts to fraudulently acquire sensitive information, such as passwords and credit card details, by masquerading as a trustworthy person or business in an apparently official electronic communication, such as an email or an instant message). Thus, an exemplary virtualization technique may be used to implement at least part of an anti-phishing policy. An exemplary method may ensure that sensitive information is used in a standard manner by a page and not subject to actions that could misdirect the information or otherwise compromise the propriety of the information.

Phishing may use some form of technical deception designed to make a link in an email appear to belong to the spoofed organization. Misspelled URLs or the use of subdomains are common tricks used by phishers, such as this example URL, http://www.yourbank.com.example.com/. One method of spoofing links used web addresses containing the @ symbol, which were used to include a username and password in a web URL (contrary to the standard).

Some phishing scams use JavaScript™ commands in order to alter an address bar, for example, by placing a picture of the legitimate entity's URL over the address bar or by closing the original address bar and opening a new one containing the legitimate URL. In another popular method of phishing, an attacker uses a bank or service's own scripts against the victim. These types of attacks (known as Cross Site Scripting) are particularly problematic, because they direct the user to sign in at their bank or service's own web page, where everything from the web address to the security certificates appears correct. In reality, the link to the website is crafted to carry out the attack.

Exemplary virtualization techniques may be optionally used for link translation. For example, content passing through a gateway or proxy may sometimes need to be changed. In particular, URLs may need to be modified so that they work correctly when accessed after passing through the gateway or proxy. In the case in which the content is created dynamically at a client, it is usually not possible to modify it as it passed through the gateway, since its final form is not known. As an example, in the case of URLs, a web page or document may contain dynamic scripts which create the URLs at run time in a client. In this case, modifying/translating the URLs at the gateway may be impossible.

With respect to link translation, an exemplary technique may change dynamic content (e.g., add dynamic content, substitute dynamic content, etc.) of a page prior to receipt or execution of the content by a target client. In the case of HTML, dynamic content can be created by scripts on the page. In the particular case of URLs created by scripts, an exemplary module can modify all link initiation scripts on the page to call a special handler introduced into the page by the gateway. The handler can then check the created URL at runtime, and decide if it needs to be modified. If it does, the handler could modify the URL according to the requirements. Created URLs can be checked before a navigation event occurs. This may be handled by changing all script calls (e.g., "window.location=MyURL", etc.) that can cause navigation of the page. Such exemplary link translation can be superior to static link translation and optionally provide an ability to translate links to any format (e.g., domain/path) thereby allowing, for example, publishing all sites to the same domain and usage of a single certificate.

Exemplary virtualization techniques may be optionally used to isolate pieces of JavaScript™ code that run in the context of a single HTML page that explicitly hosts multiple scripts. The current state of the art in hosting multiple scripts within a page typically requires either isolating the scripts in separate frames (which yields an impoverished user experience) or allowing all the script to interact within a single frame (without any barrier preventing any script from performing arbitrary manipulation of data within another script). An exemplary virtualization technique may overcome these drawbacks, allowing the user experience benefits of scripts on a same page, but preventing the scripts from manipulating each other's data. A specific example implements such a technique within the context of a script hosting site such as WINDOWS® LIVE application (Microsoft Corporation), where this technique allows running a script provided by a third party (e.g., a clock) in the same frame as the script controlling the user's email inbox, while eliminating the risk that the third party clock script will access the user's email.

Various exemplary browser protection modules operate independently of a client, such that a module can be run on a firewall, for example, with full functionality. Such an approach can support more flexible and effective deployment scenarios than client-specific solutions.

Various exemplary browser protection modules are provided in the guise of a framework for source-to-source translation, transforming unsafe code (e.g., HTML and scripts) from the web into safe code (e.g., HTML and scripts), which perform sufficient runtime checking to prevent exploits of known vulnerabilities. A framework aims to provide sufficient isolation between the browser and incoming scripts (e.g., sandboxing).

In comparing source translation to binary rewriting performed by certain virtual machines (including the ESX server of VMWare, Inc., Palo Alto, Calif.), source translation can be viewed as another technique for virtualization. That is, an exemplary browser protection module may virtualize all reads and writes to HTML elements and script objects on a page, so that the script can never directly change a page's HTML or its own source without proper safety checks, and it cannot view any of the translated source code. Thus, such an exemplary module can effectively prevent the insertion of exploits into a page, despite the high degree of flexibility afforded by scripting languages.

Various exemplary browser protection modules provide complete isolation between the original page and the browser. This allows for checking for the presence or insertion of exploits of known vulnerabilities. Such exemplary modules may include features that provide for adherence to one or more of the following principles:

a. No HTML is rendered by the browser without prior inspection by a browser protection module.
b. No script code is executed by the browser without prior translation by a browser protection module.
c. No part of a browser protection module's isolation framework can be read or written to or otherwise detected by scripts at runtime.

To preserve compatibility with existing, valid web pages, such exemplary modules may include features that provide for adherence to one or more of the following principles:

a. No names used by a browser protection module's framework clash with names used in a script.
b. No translated source code is exposed to incoming scripts at runtime.
c. The evaluation order of statements and expressions is preserved through the source translation.

Various exemplary browser protection modules are configured to completely fulfill their objectives only under on one or more of the following assumptions:

a. Incoming scripts and HTML will only arrive at the client through the firewall, which will have an opportunity to translate them. This assumption is specific to a browser protection module for MICROSOFT® ISA Server. This does not cover all cases for receiving HTML, as clients can also obtain pages out of band, and some firewalls allow encrypted pages to pass through without inspection. Various exemplary browser protection modules can significantly reduce the rate of machine compromise even with these limitations. For example, many browsers no longer execute scripts in other HTML documents such as email, and encrypted pages (obtained through HTTPS) may be expected to be relatively less frequent or a lower risk source of exploits relative to unencrypted pages; encrypted pages may be traceable to their owners and may be more trusted to some extent.

b. Incoming scripts will not rely on precise timing behavior for their logic. As source translation may insert additional checking logic, scripts can take slightly longer to execute. However, scripts are already expected to run in an extremely wide variety of environments with different available resources, so relying on timing could render the scripts quite fragile (i.e., commonly failing already).

Various exemplary browser protection modules are described with respect to particular browser software and code, however, the underlying techniques may be applied to other browser software and code. Further, instances may arise where an exemplary technique may be applicable to other instances where scripts or mark-up language are used.

Various examples are presented with respect to the INTERNET EXPLORER® browser software and JavaScript™ code, as these are among the most popular of browsers and scripting languages. Again, various approaches described herein may be generalized to other browsers and scripting languages, accounting for subtleties of script evaluation in other languages and browsers, as appropriate, which might require fairly minor changes to an exemplary module implementation.

EXAMPLE

INTERNET EXPLORER® Browser and JavaScript™ Code

An exemplary browser protection module may be a collection of modules or components or a single module or component. The description that follows refers to various features as associated with a module or a component where the module or the component may be a browser protection module or a component thereof. Further, a particular browser protection module may include or implement only those components (e.g., algorithms, routines, etc.), as desired or required to achieve a particular level of security.

In this specific example, an exemplary module uses a source translation approach based on rewriting JavaScript™ statements and expressions to perform checks and additional translation at runtime, such that all HTML code can be inspected for exploits and all JavaScript™ code, whether static or dynamically generated, can be translated before execution.

An exemplary module uses a collection of components to interpose on JavaScript™ code, allowing for comprehensive code checks and prevention of exposing any translated code. Using this interposition framework, a module creates virtualization functions to protect the browser protection module itself, handle newly generated script code, inspect all changes to the HTML Document Object Model (DOM), and remove all identified exploits.

Most components in the following sections operate in both of two separate stages. The first stage occurs on a firewall or remote host, which initially translates the page and either blocks pages with detectable exploits or removes the exploits individually. The second stage occurs at a client, where the checks inserted during the first stage are executed to ensure that no new exploits are generated by the script code. As described in this example, clients must also perform new translations of dynamically generated HTML and JavaScript™ before it can be rendered or executed, so the translation logic must exist at both firewall and client. This particular task can be accomplished by sending the translation logic to the client as JavaScript™ that is part of the translated page.

Parsing Code

In this example, an exemplary browser protection module includes an ability to parse HTML to apply element-specific vulnerability checks, as well as the ability to parse JavaScript™ to rewrite statements and expressions to perform code translation. To facilitate performing translations at runtime for any newly generated HTML or JavaScript™, the parsers are implemented in JavaScript™ (or another format) that can ship to a client's browser.

JavaScript™ Interposition

In this example, virtualization functionality is implemented using an underlying interposition framework. This framework consists of components to insert checks into incoming script code, modify values as necessary, and maintain and protect data structures of an exemplary browser protection module. Discussion of the interposition framework follows below along with a discussion of how such a framework can be used to implement virtualization to remove exploits.

Translation Functions

An exemplary browser protection module consists primarily of two top-level translation functions: one that operates on HTML and one that operates on JavaScript™ code.

$$T_H(s) : \text{unsafe HTML} \rightarrow \text{safe HTML}$$

The $T_H(s)$ function operates on a string containing HTML source code. It parses the HTML, identifies any exploits on an element-specific basis, and takes an appropriate action such as replacing the entire page with a warning to the user or removing the offending element. $T_H(s)$ also applies $T_J(s)$ to any JavaScript™ elements in the page.

$$T_J(s) : \text{unsafe JavaScript} \rightarrow \text{safe JavaScript}$$

The $T_J(s)$ function operates on a string containing JavaScript™ source code. It parses the JavaScript™ code and removes any identified exploits in the code itself $T_J(s)$ also translates statements and expressions in the script, virtualizing them to ensure runtime safety without the need for full program static analysis. Specifically, it modifies the script such that the browser will apply $T_H(s)$ to any new HTML inserted into the page at runtime, and the browser will apply $T_J(s)$ to any new JavaScript™ code that is evaluated or inserted. The mechanics of these translations are described in more detail below.

Bookkeeping Data Structures

An exemplary browser protection module includes features to store bookkeeping information, at both global and per-object levels. To handle this task, a module keeps a bshield object in the global scope, with properties for any information needed at runtime, as well as all methods needed for checks and translations. At the per-object level, a module will also reserve a similar bshield property on every object. This property is only created if needed, which includes any time a need to store untranslated values for an object's properties arises, or if an object already has a bshield object that needs to be moved. By reserving this property name, the browser protection module can ensure that any existing bshield property refers to a true data structure of the browser protection module and not something an incoming script has constructed, while the absence of a bshield property may infer or mean that a browser protection module has no bookkeeping information about the object. Note that by storing per-object information on the object itself rather than in a global data structure, an exemplary browser protection module can avoid concerns of memory leaks when objects go out of scope and are garbage collected, where those concerns exist.

Untranslated Values

In this specific INTERNET EXPLORER® browser and JavaScript™ code example, an exemplary browser protection module hides all translated HTML and JavaScript™ code from read operations by incoming scripts, to preserve compatibility. To motivate that reads as well as writes require interposition, consider the following example, which illustrates the problem of only interposing on writes: a script might attempt to read its own source code, alter a portion of it based on a particular index, and then write the result back as new code. If it performs such an operation on translated code, it will likely fail.

Instead, an exemplary browser protection module maintains untranslated copies of all code translated or to be translated, and returns this as the result of any relevant read. This is primarily used for untranslated JavaScript™ code, but can be particularly useful for viewing HTML with embedded JavaScript™ as well. These untranslated copies can simply be stored in an untransVals hashtable on the relevant object's bshield property, such that they remain properly hidden from incoming scripts and accessible to the framework.

A relevant subtlety of browser semantics is that both HTML and JavaScript™ can be modified at both a fine and coarse granularity. For example, the entire HTML of a page can be altered by assigning to document.body.innerHTML, or lines can be appended using document.write, or individual HTML elements can be modified. To maintain a consistent view of the untranslated code, an exemplary browser protection module can use a similar technique as the browser itself whereby all changes will be stored internally at the finest granularity, and any attempt to view the entire HTML will be performed by walking a DOM tree and printing each node systematically, using untranslated values when available. This is consistent with the behavior of INTERNET EXPLORER® browser service, but it should be noted that this does not result in a letter-for-letter copy of the original source.

Scripts can also be modified incrementally by changing function bodies, but generally the browser does not maintain an up-to-date copy of the whole script source code to display. Instead, commonly reads of a script object's text property return stale values after individual functions are changed, which simplifies the task of returning the corresponding stale untranslated code.

In this way, an exemplary browser protection module may be expected to mimic the browser's behavior for reading HTML and JavaScript™ source code, maintaining the illusion to the incoming scripts that no translation has been performed.

Renaming

An exemplary browser protection module includes features to prevent name clashes with bshield objects, to prevent scripts from reading or writing data structures of an exemplary browser protection module, either intentionally or inadvertently. To do so, an exemplary browser protection module remaps any name appearing in a script which conflicts with data structures or other remapped names. This process primarily involves static name rewriting during translation to protect the global bshield object, noting that an exemplary browser protection module can treat the bshield object properties as special cases of untranslated values to handle at runtime. For name rewriting, an exemplary browser protection module may use a mechanistic transform that simply adds a common suffix to certain names, such that the new names are unique and can be computed without a hashtable or mapping data structure.

Specifically, an exemplary browser protection module can syntactically replace any occurrence of variable names matching the pattern bshield (_*) with the same name suffixed with an extra _. This allows an exemplary browser protection module to reserve the use of the bshield name for the global bookkeeping data structure, and it provides a unique name for all variable names which might conflict with generated names. It is of note that JavaScript™ does not appear to have a documented maximum length for variable names, which may be accounted for in such an approach.

A replacement is typically done during translation, for all occurrences of variable names throughout the program, whether global, local, or function arguments. This ensures consistent behavior regardless of scope. A particular case concerns the Function constructor, which allows function argument names to be passed as strings. Such names may shadow the global bshield object, hence, an exemplary browser protection module may include virtualization functions that check for this case and rename arguments if necessary.

The same syntactic renaming technique will not generally work to protect bshield object properties, since property names can be generated at runtime to bypass renaming. Instead, an exemplary browser protection module can eliminate the need to rename object properties by taking advantage of the untranslated values data structure. Specifically, any attempt to read or write to obj.bshield by an incoming script is redirected to obj.bshield.untransVals ["bshield"], which ensures that no incoming script code has access to our bshield structure.

Statement and Expression Rewriting

Since the program analysis required to determine whether a script will insert an exploit at runtime may be problematic (e.g., undecidable in the limit), an exemplary browser protection module may rely on runtime checks to avoid the rendering of unsafe HTML or the execution of unchecked JavaScript™ code. However, an exemplary browser protection module can limit checks to only those statements and expressions that might affect the state of the DOM or the executable code.

Given that vulnerable objects may be aliased, one strategy includes virtualization of all object property reads, all object property writes, and all method and function calls. Writes to primitive (non-object) variables can typically be safely ignored, as can direct use or manipulation of primitive values, since such statements cannot affect the state of the DOM or executable code. However, a strategy should consider a handful of other JavaScript™ control constructs, which might otherwise provide evasion techniques or reveal an exemplary browser protection module's data structures. An outline for the necessary translations for each type of relevant JavaScript™ statement and expression is discussed herein. Most translations replace a statement or expression with a function invocation, which encapsulates the virtualization logic and avoids name clashes with the surrounding scope.

Note that, as in script interpretation, this task requires recursive translation of the abstract syntax tree (AST). An exemplary browser protection module can expect to visit each node of the AST once during the translation, so the process is guaranteed to halt given a finite length web page.

Rewriting Property Reads

In this particular INTERNET EXPLORER® browser and JavaScript™ example, any read of an object's properties is virtualized to determine if the read would reveal HTML or JavaScript™ code. This includes properties such as document.body.innerHTML, or a script object's text field. If so, then an exemplary browser protection module returns the untranslated code rather than the code in use by the browser. This ensures that scripts will not be exposed to the translated code, which could be problematic in cases such as attempts to make incremental, index-based updates to code. An example translation is shown below, with the special case for dealing with a "bshield" field name.

```
Original line:
    var x = myScript.text;
Translated line:
    var x = bshield.propRead(myScript, "text");
Additional code:
    bshield.propRead = function(baseObj, field) {
        // Make sure not to expose bshield property
        if (field == "bshield") {
            // Create our bshield object if not created
            if (typeof baseObj.bshield == 'undefined') {
                baseObj.bshield = new Object( );
                baseObj.bshield.untransVals = new Array( );
            }
            return baseObj.bshield.untransVals["bshield"];
        }
        // Field name is not bshield
        else {
            // Look for a stored untranslated value to return
            var untransVal;
            if (typeof baseObj.bshield != 'undefined') {
                untransVal = baseObj.bshield.untransVals[field];
            }
            if (typeof untransVal != 'undefined')
                return untransVal;
            // No untransVal; return the real thing
            else return baseObj[field];
        }
    };
```

Rewriting Property Writes

Writes to object properties should be safeguarded for several reasons. The write might attempt to assign new HTML to a DOM object, new JavaScript™ code to a script object or function, or new values to an exemplary browser protection module's data structure. An exemplary browser protection module may determine how to virtualize the write based on the runtime type or identity of the object, translating or rejecting the write if necessary. Note that in the example translation below, the arguments are passed to the translation function in an order preserving the original JavaScript™ code evaluation order, which is different than most traditional languages. Noting that in JavaScript™ code, function arguments are evaluated from left to right, after the receiver expression and method name are resolved.

```
Original line:
    myScript["text"] = str1;
Translated line:
    bshield.propWrite(myScript, "text", str1);
Additional code:
    bshield.propWrite = function(baseLHS, field, rhs)
    {
        // Compute any modifications to right hand side first
        newRHS = bshield.virtualPropWrite(baseLHS, field, rhs);
        // Make sure not to assign to bshield property
        if (field == "bshield")
            baseLHS.bshield.untransVals["bshield"] = newRHS;
        // Assign to the real property
        else baseLHS[field] = newRHS;
    };
```

In this example, the bshield.virtualPropWrite function looks up and applies a virtualization function that is appropriate for the given left hand side and field name. The function modifies the given right hand side if necessary, keeping an untranslated copy in the object's untransVals table and returning the translated value for use in the actual assignment. The choice of virtualization function is based on the identity, type, and/or properties of the baseLHS argument. For instance, DOM objects can be identified by checking whether document.body.contains (baseLHS) returns true, in which case baseLHS's nodeName property reveals its type. Examples of assignment virtualization functions are given below.

Default (no-op) virtualization function:

```
function(baseLHS, field, rhs) {
    return rhs;
}
```

Example DOM element virtualization function:

```
function(baseLHS, field, rhs) {
    baseLHS.bshield.untransVals[field] = rhs;
    // Apply T_H to the new value for a DOM property
    return bshield.translateHTML(rhs);
}
```

Rewriting Method and Function Calls

In general, method and function calls require checks similar to both property reads and property writes, since they can return values that might need to be hidden and they can accept arguments that might affect the DOM or executable code. An exemplary browser protection module can simply wrap each invocation with an appropriate virtualization function, which inspects or translates both the arguments and return values. An example translation is shown below.

```
Original line:
    document.write(newStr);
Translated line:
    bshield.invoke(document, "write", newStr);
Additional code:
    bshield.invoke = function(recv, methodName) {
        // Get a list of all arguments past the first two
        args = bshield.invoke.arguments.slice(2);
        // Get a "wrapper" virtualization function
        wrapper = bshield.getVirtualMethod(recv, methodName);
        // Get a callable function
        func = recv[methodName];
        // Redirect if the method is "bshield"
        if (methodName == "bshield") {
            // Create our bshield object if not created
            if (typeof recv.bshield == 'undefined') {
                recv.bshield = new Object( );
                recv.bshield.untransVals = new Array( );
            }
            func = recv.bshield.untransVals["bshield"];
        }
        return wrapper(recv, func, args);
    };
```

The bshield.getVirtualMethod function returns a wrapper function specific to the given receiver object and method name, based on the identity, type, and/or properties of the receiver. The wrapper function is responsible for any necessary modifications to the arguments or return value, as well as side effects such as storing untranslated values. Note that the method to invoke is passed to the wrapper function as a callable function independent of the receiver object (so that calls to a bshield method can be redirected), but the recv argument is still necessary, in case untranslated values need to be stored on it. Example wrapper functions are below.

Default (no-op) method virtualization wrapper function:

```
function(recv, func, args) {
    return func.apply(args);
}
```

Example document.write virtualization wrapper function, which translates the entire HTML after appending to the untranslated copy:

```
function(recv, func, args) {
    // Append arg0 to untranslated HTML
    html =
    document.body.bshield.untransVals["outerHTML"];
    html += args[0];
    document.body.bshield.untransVals["outerHTML"] =
    html;
    // Translate and replace entire HTML
    transHTML = bshield.translateHTML(html);
    document.body.outerHTML = transHTML;
}
```

This technique of replacing the function to be protected with a wrapper nicely handles aliasing issues. A function created at runtime to alias a method such as document.write will actually alias the appropriate wrapper. This technique ensures that the appropriate checks are performed regardless of how the function is called.

Rewriting Control Constructs

A handful of JavaScript™ control constructs should be considered as special cases, since their use could expose an exemplary browser protection module's objects or allow evasion of an exemplary browser protection framework.

The first such construct involves iteration over object properties using a "for (i in myObject)" expression. To hide the presence of a bshield property when there is no such property in the incoming script, a module can perform the following transformation:

```
Original code:
for (i in myObject) {
    // Code...
}
Translated code:
for (i in myObject) {
    if (i == "bshield" && typeof
        myObject.bshield.untransVals[i] ==
    'undefined')
        continue;
    // Code...
}
```

Here, the second construct to consider is the "with" construct, which allows object properties to be referenced without explicitly naming the object:

```
with (myObject) {
    field = 3;
}
```

If field is not a local variable, myObject.field will be assigned 3. This may be problematic because it confuses local or global variables with object properties, and it is thus may be unclear which technique should be used to avoid naming a bshield object. An exemplary strategy eliminates with constructs by manually expanding them into statements that an exemplary browser protection module can translate. The code snippet above would thus become:

```
if (typeof field == 'undefined') myObject.field =
3;
else field = 3;
```

An exemplary browser protection module can then translate this as already discussed.

Handling Generated Code

The JavaScript™ code interposition framework described above is sufficient for building an exemplary browser protection module's virtualization functionality. The remaining work consists of a set of virtualization functions invoked by the interposition framework. A set of these functions prevent the script from directly modifying its own code, which would otherwise allow it to eliminate all of an exemplary browser protection module's checks. Thus, an exemplary browser protection module may include virtualization functions for all techniques to read or write JavaScript™ code, applying the $T_J(s)$ translation function before the new code is assigned or evaluated. This includes virtualizing certain properties of script objects (e.g., the text property), the eval method, and the Function constructor. For a fairly comprehensive list of self-modification techniques see the description under the heading JavaScript™ code Characteristics.

Protecting the DOM

The next set of virtualization functions prevents scripts from directly inserting new HTML into the DOM, such that exploits can be detected before they are rendered. Just as an exemplary browser protection module can virtualize all techniques to modify JavaScript™ code, an exemplary browser protection module can virtualize all techniques to modify DOM elements, applying the $T_H(s)$ translation function before any new HTML is rendered. A discussion for all techniques to modify the DOM, including entire page updates, appending strings, and updating individual DOM elements, appears under the heading JavaScript™ Characteristics.

Removing Exploits

An exemplary browser protection module can detect and remove browser exploits, using both a static pass over the parsed HTML and virtualization functions to check for inappropriate uses of ACTIVEX® controls (Microsoft Corporation), etc. Since an exemplary browser protection module parses and translates all new HTML and JavaScript™ code before rendering or execution, checks for exploits will be performed comprehensively. In this way, an exemplary browser protection module can prevent the execution of exploits for all vulnerabilities specified to the browser protection module.

The static pass to find exploits involves parsing the HTML and applying tag-specific checks to each node in the tree, such as finding <iframe> tags with certain long property values which would overflow a particular buffer. Such exploits will be detected, and a policy can determine whether, for example, to reject the page entirely or simply replace the exploit with an informative message to the user. An example checking function is presented below.

```
function checkIFrameTag(tag) {
    if (tag.src.length > 256 && tag.name.length > 256) {
        return "<i>exploited iframe removed</i>";
    }
    else return tag;
}
```

Opportunities for Optimization

An exemplary method may reduce the number of statements and expressions that must be translated by using a static analysis to identify which objects and functions do not require virtualization. For example, a variable assigned to a newly constructed non-vulnerable object (as identified statically) will not require any checks for all statements dominated by the assignment. This technique may reduce time or demand on resources for implementation of an exemplary browser protection module.

An exemplary browser protection module includes an ability to inspect all code and/or variable values before rendering or execution where all exploits can be examined, legal incoming script behavior can be preserved, and translations can be performed independently of client machines (e.g., allowing a browser protection module to be deployed at a firewall or proxy cache). This last property can vastly simplify deployment and magnify its impact. Further, given certain heterogeneous environments, a firewall may tailor its changes to a client's specific browser. Various source translation approaches disclosed herein may be extended to handle encrypted or out-of-band pages by running the same logic at the client, in an alternate usage scenario. In various examples, a need for the translations to be idempotent does not exist, for example, where translated code will never be translated again (e.g., only original code is accessible to scripts when they attempt to modify themselves).

With respect to reducing demand on resources or time, an exemplary method may optionally perform a partial parse when a page loads, etc. For example, such an approach may just enumerate objects and functions and then parse them only when each object or function is called. This approach can improve performance as well as reduce memory consumption since objects that are not used directly will not be parsed, and objects that have been parsed but are not used anymore can be deleted from memory.

An exemplary browser protection module operates in a learning loop. For example, a module may miss from time-to-time particular exploits (as exploits typically emerge over time). In other words, depending on the environment used, it may be difficult to identify and instrument all possible ways to reference HTML and JavaScript™ code from within a script. Learning may occur whereby a software service (e.g., a browser) provides feedback to a browser protection module or an associated service. Such feedback can reveal techniques that can be addressed by updating a browser module. Such a feedback mechanism allows for monotonic improvement for covering evasion or exploitation techniques.

Various exemplary browser protection modules include shipping translation code to a client to allow it to be invoked at runtime. Where appropriate, such shipping may be protected to help prevent attackers from studying implementation details or otherwise modifying such shipped code.

Translation Using Object Replacement

An exemplary method that may be used in conjunction with various aforementioned methods, or as an alternative, includes replacing all references to vulnerable or relevant objects with safe aliases that provide a level of indirection. Thus, in this example, translated pages would never directly access the DOM or any technique for modifying their own source code, but would instead modify "wrapper" objects that mediate access to the DOM and script code. For example, changes to the document DOM object would be rewritten as changes to a safeDocument object. Any property writes or method calls would first be checked and sanitized, and then applied to the real document. Similarly, any property reads would return information about the original source code, effectively hiding the translated code running in the actual page.

While this wrapper approach has many of the same characteristics as various other techniques, a difference is that it relies on textual representations of vulnerable and relevant objects (e.g., replacing "document" with "safeDocument" in the code), rather than relying on object identity. This would be a sufficient isolation technique, if the only way to originally access these objects is by name (and aliases cannot be created through some indirect means). With respect to implementation, the replacement objects may have up-to-date copies of all properties and methods for each read and write operation. While this technique may involve unnecessary overhead, since it creates replacement objects for all vulnerable objects without knowing whether they will be accessed in a vulnerable way or not, checks at the site of the change can, in some instances, reduce overhead.

Translation Using Event Handlers

Another exemplary method includes using JavaScript™ code's event model to react to HTML or script changes. More specifically, in this example, a framework "listens to" (e.g., monitors) any property change events for HTML or script objects, and then inspects any new code before the browser executes it. This particular technique is, in general, not concerned with how the DOM or script code is changed, but only when it is changed. While malicious scripts may attempt to reassign the property change listeners on an object to bypass checks, since the event corresponding to this change is passed to the new listener and not the old one, prevention of such a listener change may be achieved via source translation (see, e.g., various examples above).

An exemplary method includes an event model technique as a component of a browser protection module. Such a method may be used in instances where enumerating all ways to change the DOM proves difficult. In this example, a browser protection module may react to DOM changes through events rather than per-statement checks.

Browser Instrumentation

An exemplary browser protection module may be implemented at a browser. Such an implementation approach can provide a significant degree of isolation between logic of the browser protection module and any malicious code, thereby reducing the chance that pages could bypass checks. Such an implementation may account for browser and JavaScript™ engine specifics and optionally cover additional attack vectors such as ACTIVEX® controls etc. Finally, for this approach, it is worth noting that the advantages over current browser patching practices are less compelling, since it would require per-client installations and updates. Nevertheless, if implemented within the browser, the mechanism could be used instead of patching for vulnerabilities. This can allow a browser maker to react quickly to newly discovered vulnerability by issuing a browser protection module signature, thus protecting the browser. The maker can then work on a patch at a leisurely pace and deploy to customers in a pre-determined schedule (e.g., once every 4 months or other basis depending on risk).

Vulnerability and Policy Specification

Browser vulnerabilities and corresponding policies may be expressed in a convenient, modular way, so that an exemplary browser protection framework can remain unchanged as it protects against new vulnerabilities that are discovered. For example, an initial implementation implements checks directly as functions within a browser protection framework.

Additional Applications of Exemplary Technology

In addition to stripping out exploits of browser vulnerabilities from pages served to clients from a firewall or proxy cache, various exemplary browser protection techniques may be used in any of a number of other usage scenarios to increase security (e.g., client security). An exemplary protection module may perform transformation in conjunction with one or more web services that provide content from potentially untrusted third parties, such as advertisements on a MSN® Internet service or the contents of a MSN® or other service cache (e.g., a GOOGLE® service cache, Google Inc., Mountain View, Calif.). An exemplary protection module optionally incorporates policies for slightly different types of attacks, such as malicious sites that pop up windows in front of valid sites to trick users into submitting personal information. In such a scenario, an exemplary technique could insert JavaScript™ code to ensure that all pop up windows show an address bar, to eliminate confusion about the origin of the window. Such an approach can protect a client from a malicious web page(s). An exemplary protection module may prevent alteration of one or more visual indications displayable to a user (e.g., by a client) where the one or more visual indications pertain to origin of a page or code.

The description that follows discusses a system and some possible operations associated with various exemplary browser protection mechanisms. Of course, implementation may occur in other systems or other manners. As already mentioned, various exemplary mechanisms may be used to reduce or eliminate exploitation risk of a software service that relies on scripts or other data as input for operations.

FIG. 1 shows a system 100 and a process 140 that may occur on such a system. The system 100 includes one or more servers 104, 108, 112, one or more clients 114, 118 and one or more networks 120, 124 for communication between various servers and clients. The network 120 may be the Internet while the network 124 may be an intranet where the server 112 operates as a local server.

In the system 100, a computer may operate as a firewall or a router device. A firewall is generally a set of related programs, located at a network gateway server that protects the resources of a private network from users from other networks. An enterprise with an intranet (e.g., the network 124) that allows its workers access to the wider Internet (e.g., the network 120) may install a firewall (e.g., on the server 112) to prevent outsiders from accessing its own private data resources and for controlling what outside resources its own users can access.

A firewall often works closely with a router program that can examine network packets to determine whether to forward a packet(s) to an intended destination. A firewall may also include or work with a proxy server that makes network requests on behalf of users (e.g., the client 114).

Various firewall screening techniques exist. For example, a firewall may screen requests to make sure they come from acceptable or trusted (e.g., previously identified) domain name and Internet Protocol addresses. A firewall may also screen domain names or addresses (e.g., URLs) to determine if they are associated with acceptable or trusted resources.

The process 140 of FIG. 1 pertains to a client browsing various resources using client software 154 such as browser software. In this example, the client software 154 includes an HTML host 156 and a script host 158. The client software 154 allows a user to enter or select a resource associated with a universal resource locator (URL). The client software 154 uses the URL to locate a resource such as information stored on one of the servers 104, 108, 112. In other examples, a server may include server software with such an HTML host, a script host, or both, i.e., while a client is indicated, such a process may include servers only, a mix of clients and servers, etc.

According to the process 140, a server that includes server software 144 receives a request for a resource or resources from the client software 154. In turn, the server software 144 executes a procedure that provides, for example, code in response to the request. The server software 144 may provide data other than code as an alternative or in addition to providing code. The client receives the code and the client software 154 uses the code, for example, to generate a frame for display on a user screen. Where the server software 144 provides data other than code, then the client software 154 may use the data.

The process 140 also includes server software 148, which may be installed on the same server as server software 144 or on a different server. In some instances, as already discussed, a browser may encounter a page that includes a URL for another page, which may be associated with server software 148.

Consider an example where the code includes code written in a markup language such as the hypertext markup language (HTML) and where the client software 154 is web browser software. The HTML host 156 of the browser software 154 includes a HTML parser such that when a page (e.g., a document) is accessed by the browser, the HTML parser reads the code (e.g., usually in the form of a file) and creates elements from HTML tags that appear in the code. For example, INTERNET EXPLORER® browser software includes a component "Mshtml.dll" that performs the HTML parsing and rendering and it exposes an HTML document through the Dynamic HTML Object Model. This component can host one or more scripting engines, virtual machines, ACTIVEX® controls, plug-ins, and other objects that might be referenced in a loaded HTML document (e.g., code/data).

According to the process 140, the code may include script. For example, the JScript script language, which is an interpreted, object-based scripting language, may be used or another script language. Such scripts usually rely on a script interpreter or "host" (e.g., the script host 158). Examples of hosts for Jscript scripts include active server pages, INTERNET EXPLORER® browser software and WINDOWS® script host. Again, while code is mentioned, data may be provided alternatively or in conjunction with code.

Figure 2:
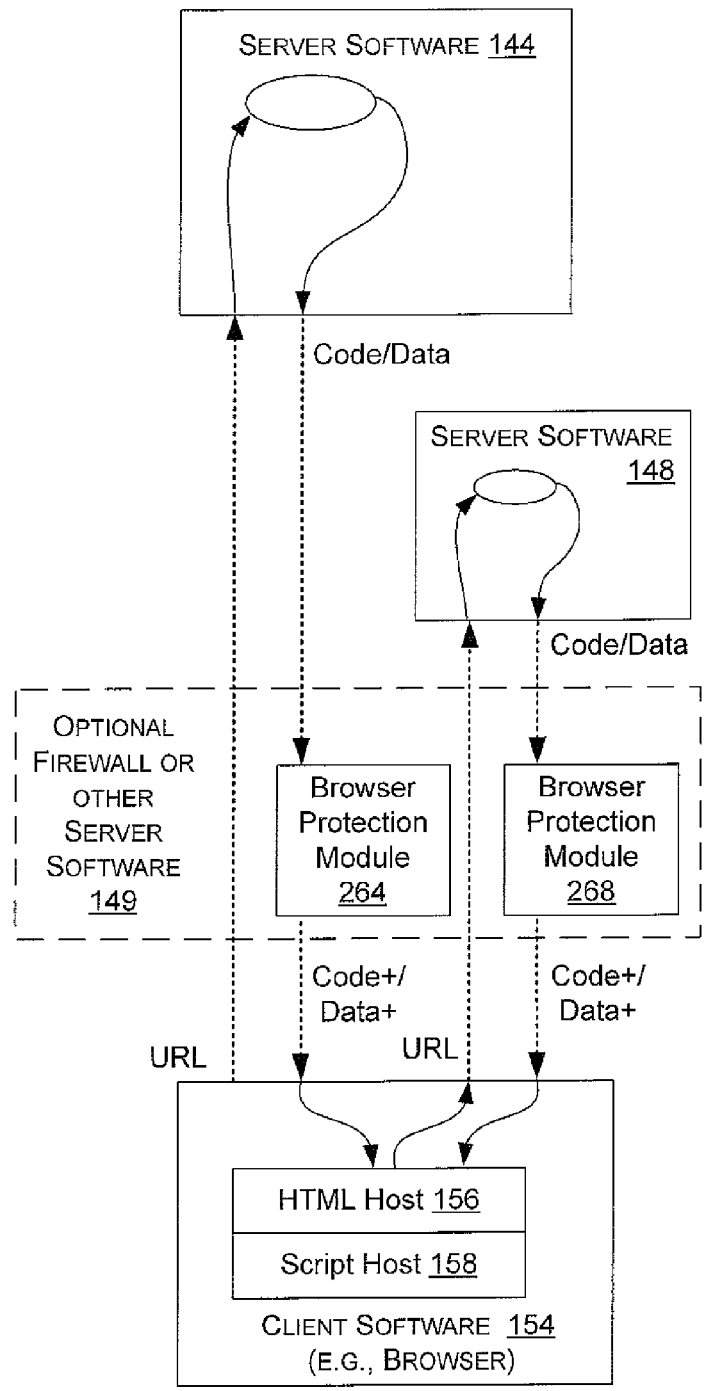
FIG. 2 is a diagram of an exemplary process that includes one or more browser protection components.

FIG. 2 shows an exemplary process 240 which includes various features of the process 140; however, exemplary browser capabilities 264, 268 are included. In this example, the browser protection components 264, 268 act on code, data, or code and data prior to receipt by the client software 154. In other examples, browser protection components may be part of client software. The selection of location for such an exemplary browser protection component in a process can depend on a variety of factors. For example, an organization with an intranet (e.g., the network 124) may choose to locate such a browser protection component on a firewall or gateway server (e.g., the server 112) for sake of maintenance, security, efficiency, etc. A dashed line indicates such a location in conjunction with firewall or other server software 149.

In the example of FIG. 2 and various other examples, the term "code+/data+" identifies code, data or code and data that has been transformed by a browser protection module or component and, throughout, the term "code/data" refers to code, data or code and data. Transformed code/data can include code/data that has been checked to determine risk of its ability to exploit one or more software vulnerabilities (e.g., browser software vulnerabilities), code/data that has been injected with additional code that acts to perform such checks (e.g., at runtime or prior to runtime), code/data that has been injected with additional code that otherwise aims to prevent execution of malicious code at runtime. Again, in general, the process of transforming generally involves inserting or otherwise associating code with received information (e.g., code, data, code and data) or altering (e.g., changing, deleting, etc.) received information and the resulting code/data is referred to as transformed code/data (e.g., code+/data+).

The example of FIG. 2 shows server software 144 and server software 148 as well as browser protection module 264 and browser protection module 268. As already mentioned, a page may cause a browser to access another page where the other page is accessed using a different server or using different server software. While, in general, a single browser protection module may suffice, where desired or appropriate more than one browser protection module may be implemented. Further, the features of a browser protection module may be based on, for example, server software, URL, server type, server ownership, etc.

An exemplary computing device includes a network interface, a processor and a computer-readable medium that includes instructions executable by the processor (i) to transform code received via the network interface to ensure acceptable use of sensitive information input or received at a client during execution of the code by a web browser application or an email application and/or (ii) to transform code received via the network interface upon a request from a client to prevent exploitation of known vulnerabilities of the web browser application wherein the transforming comprises at least one action selected from a group consisting of adding code, replacing code and revising code. Such an exemplary computing device may include instructions to transmit the transformed code to the client via the network interface. With respect to acceptable use, the method may ensure that the information cannot be directed to a party other than an intended party or otherwise become known to a party without authorization for the information. For example, passwords, Social Security numbers, credit card numbers, etc., are typically viewed as sensitive information. An exemplary method may include procedures that provide blanket protection for all information or that can recognize formats (e.g., nine digits as being a Social Security number, etc.) or other characteristics of sensitive information (e.g., a string that includes a combination of letters and one or more numbers as being a password, etc.) and provide protection for such recognized sensitive information.

Figure 3:
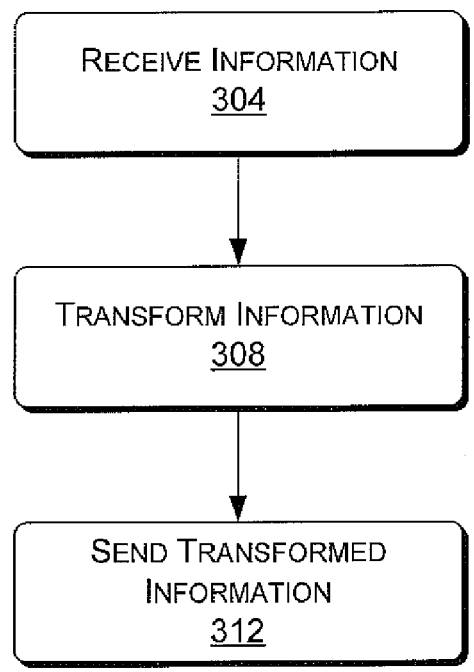
FIG. 3 is a diagram of an exemplary method for transforming information to prevent or reduce risk of an attack on a software vulnerability.

FIG. 3 shows an exemplary method that transforms information to reduce or eliminate risk of exploitation of a software service. A reception block 304 receives information in response to a request where the received information is for consumption by a software service (e.g., a browser software service). For example, the received information may be code, data or code and data used by web browser software to present a web page on a user's computer monitor. The reception block 304 receives information, for example, from a server in response to a request by a user or other entity.

A transformation block 308 transforms the received information to produce transformed information where the transforming transforms the received information to reduce or eliminate the received information's ability to exploit a software service. For example, consider the various exemplary browser protection techniques discussed above, which may be used to perform the transforming. A transmission or send block 312 transmits the transformed information, for example, to the entity that requested the information. In other examples, the transformed information may be directed to an entity other than that which made the request (e.g., an email immunization service may act to send transformed code to an entity or entities on behalf of another entity that requested code).

An exemplary method may include receiving code in response to a request wherein the received code includes code executable by a web browser application, transforming the received code to prevent exploitation of known vulnerabilities of the web browser application wherein the transforming includes at least adding code, replacing code and/or revising code and, where appropriate, transmitting the transformed code for execution by the web browser application.

An exemplary method may include receiving code wherein the received code includes code executable by a web browser application or an email application of a client, transforming the received code to ensure acceptable use of sensitive information input or received at the client during execution of the code by the web browser application or the email application and, where appropriate, transmitting the transformed code to the client for execution by the web browser application or the email application.

An exemplary method may include transforming script code to transformed script code whereby an attempt by the transformed script code to modify itself during execution by the web browser application initiates a check that can prohibit the attempted modification.

An exemplary method may include receiving HTML code that includes script and inserting a hook into the HTML code wherein the hook responds to a runtime event to call for action to prevent exploitation of a browser software vulnerability by the script. In such an example, the step of inserting a hook into the HTML code acts to immunize the code. If such an exemplary method occurs on a computer (e.g., a server) that is not an end user (e.g., for consumption of the received code), then the exemplary method may further send the transformed code to an intended recipient (e.g., a client).

In various examples, transformed data includes inserted or otherwise associated code with logic to prevent exploitation of a software service such as a browser software service.

With respect to web pages that rely on markup language, such pages may include static HTML pages or dynamic HTML pages. In general, a user requests a static page by typing in an URL, clicking a link pointing to an URL, etc. As already described, the URL request is sent to a server or other computer, which responds by returning the static HTML page (e.g., an HTML coded document).

Dynamic pages are generally created in response to a user's request. For example, browser software may act to collect information by presenting a page with text boxes, menus, check boxes, etc., that a user fills in or selects. Data from the form is then sent to, for example, a server that may pass the data to a script or application to be processed, query or post data to a database, etc. Then, the server returns the result(s) to the user in an HTML page.

While various scripts mentioned herein pertain generally to web browser software, other scripts exist, for example, associated with SQL™ language (Oracle Corp., Redwood Shores, Calif.) and object-oriented programming languages such as the VISUAL BASIC® language, etc. Various exemplary techniques described herein may be applied to suspect code where such scripts are used.

JavaScript™ Code Characteristics

The section that follows serves to illustrate various aspects of the JavaScript™ language. Language features and exemplary techniques for modifying HTML and source code at runtime are presented.

Object Property Syntax

Objects have partial duality with arrays, which allows their properties to be accessed and modified in multiple syntactic ways.

```
obj.field = val
obj["field"] = val
obj[n] = val, where n is the index of the field.
```

While normal array-style iteration does not work with objects, there is a for ... in construct that allows iteration over object properties:

```
for (var i in obj) { ...obj[i]... }
```

However, unlike arrays, objects do not automatically have a length property.

Object properties can be accessed without naming the object itself, using the with construct:

```
with (obj) {
    field = 3;
}
```

In the above example, if field is not defined as a local variable, it is treated as obj.field.

Object properties can also be deleted, using the delete statement:

```
delete obj.field;
```

Evaluation Order

JavaScript™ code has an evaluation order different than most programming languages, where a given line is evaluated from left to right, apparently regardless of structure. For example, in the code below, getObj( ) is evaluated first, then getField( ), then getArg1( ), then getArg2( ).

```
getObj( )[getField( )](getArg1( ), getArg2( ));
```

Function Passing Semantics

JavaScript™ code implements closures properly, so that free variables within a function are bound to values at the function's definition site, not its invocation site. Thus, the following example prints 3, not 4:

```
var x = 3;
function f( ) { document.write(x); };
function g( ) {
    var x = 4;
    f( );
}
g( );
```

Threading

There does not appear to be any concrete documentation guaranteeing that JavaScript™ code execution is single-threaded, but this appears to be a safe assumption, since there are not any synchronization constructs. If JavaScript™ code execution later becomes multi-threaded, an exemplary module may properly ensure that virtualization functions operate atomically with the code they guard.

Relevant Objects, Methods, and Functions

Below are non-exhaustive, enumerated known ways for scripts to reference HTML and their own code, to help ensure provision of complete isolation through exemplary protection module transformations.

Ways to Run Scripts

JavaScript™ code can be run directly from HTML in several ways (not including techniques to run new JavaScript™ code from within JavaScript™ code):

```
Inside a script tag:
<script>
    x = 1;
</script>
As an event handler attribute. There is a long list of know event handler
attributes, but it may be sufficient to have a heuristic of treating any
attribute starting with "on" as an event handler. For example:
<input onclick="x = 1;" />
As a JavaScript ™ URL, which can be used in place of any normal URL,
such as link HREF attributes or image SRC attributes:
<a href="javascript:x = 1;"></a>
Apparently, Netscape 3 had a notion of JavaScript ™ entities.
<table width="&{x*2};">
```

Ways to Access HTML

HTML can be accessed through properties of DOM objects. This includes:

```
The innerHTML, outerHTML, innerText, and outerText
properties of any DOM object (e.g., document.body).
Any documented property on DOM objects in the page, such as links,
tables, images, etc, which can be visible as attributes on the HTML tags.
```

Ways to Modify HTML

HTML can only be modified through properties and methods of DOM objects. Known vectors for change include:

```
Assigning to properties mentioned above.
Call methods on the document DOM object to append to the HTML:
    document.write
    document.writeln
Call methods on any DOM object to append adjacent HTML or text:
    myObj.insertAdjacentHTML("beforeEnd",
        "<b>1</b>");
    myObj.insertAdjacentText("beforeBegin",
        "prefix");
```

Ways to Access Executable Code

JavaScript™ code is accessible primarily through the text property of script objects. It can also be viewed within the HTML of a page or tag that contains scripts, such as the innerHTML property of any DOM object. Finally, the code for individual functions can be accessed by printing out the function itself:

```
function f(x) { return x + 1; }
document.write(f);    // prints out the line above
```

Ways to Execute Generated Code

There are several ways that a script can cause an arbitrary string to be executed as JavaScript™ code. These include:

The eval function. Allows an arbitrary string of code to be executed. Important reference info can be found here: http://developer-test.mozilla.org/en/docs/Core_JavaScript_1.5_Reference:Functions:eval
An object's eval method (deprecated in 1.2, removed in 1.4). Older versions of JavaScript ™ allow this method to execute a string of code in the context of an object.
Assigning to the text property of script objects. The string assigned to this property is immediately executed.

Using the Function constructor. This takes in an array of string arguments and a string with the code for the function.

Known Vulnerable Tags and Objects

An exemplary module may use and/or collect a list of known vulnerabilities for checking.

Exemplary Computing Environment

The various exemplary technologies may be implemented in different computer environments. The computer environment shown in FIG. 4 is only one example of a computer environment and is not intended to suggest any limitation as to the scope of use or functionality of the computer and network architectures suitable for use. Neither should the computer environment be interpreted as having any dependency or requirement relating to any one or combination of components illustrated in the example computer environment.

FIG. 4 illustrates an example of a suitable computing system environment 400 on which various exemplary methods may be implemented. Various exemplary devices or systems may include any of the features of the exemplary environment 400. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

Various exemplary methods are operational with numerous other general purpose or special purpose computing system environments or configurations. Examples of well known computing systems, environments, and/or configurations that may be suitable for implementation or use include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Various exemplary methods, applications, etc., may be described in the general context of computer-executable instructions, such as program modules, being executed by a computer. Generally, program modules include routines, programs, objects, components, data structures, etc., that perform particular tasks or implement particular abstract data types. Various exemplary methods may also be practiced in distributed computing environments where tasks are performed by remote processing devices that are linked through a communications network or other communication (e.g., infrared, etc.). In a distributed computing environment, program modules may be located in both local and remote computer storage media including memory storage devices.

With reference to FIG. 4, an exemplary system for implementing the various exemplary methods includes a general purpose computing device in the form of a computer 410. Components of computer 410 may include, but are not limited to, a processing unit 420, a system memory 430, and a system bus 421 that couples various system components including the system memory 930 to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 934, application programs 435, other program modules 436, and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media (e.g., DVD, etc.). Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a data media interface such as interface 440, and magnetic disk drive 451 and optical disk drive 455 are typically connected to the system bus 421 a data media interface that is optionally a removable memory interface. For purposes of explanation of the particular example, the magnetic disk drive 451 and the optical disk drive use the data media interface 440.

The drives and their associated computer storage media discussed above and illustrated in FIG. 4, provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. A user may enter commands and information into the computer 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus 421, but may be connected by other interface and bus structures, such as a parallel port, game port or a universal serial bus (USB). A monitor 491 or other type of display device is also connected to the system bus 421 via an interface, such as a video interface 490. In addition to the monitor 491, computers may also include other peripheral output devices such as speakers and printer, which may be connected through an output peripheral interface 495.

The computer 410 may operate in a networked environment using logical connections to one or more remote computers, such as a remote computer 480. The remote computer 480 may be a personal computer, a server, a router, a network PC, a peer device or other common network node, and typically includes many or all of the features described above relative to the computer 410. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in a remote memory storage device. By way of example, and not limitation, FIG. 4 illustrates remote application programs 485 as residing on the remote computer 480 (e.g., in memory of the remote computer 480). It will be appreciated that the network connections shown are exemplary and other means of establishing a communications link between the computers may be used.

Although various exemplary methods, devices, systems, etc., have been described in language specific to structural features and/or methodological acts, it is to be understood that the subject matter defined in the appended claims is not necessarily limited to the specific features or acts described. Rather, the specific features and acts are disclosed as exemplary forms of implementing the claimed subject matter.

The invention claimed is:

1. A computer-implementable method comprising:
receiving code, at a firewall device, from a server in response to a user request, the code including mark-up language code and script code;
prior to runtime execution, employing a first translation function and a second translation function to transform the code to prevent exploitation of vulnerabilities of a web browser application, wherein:
the first translation function:
parses the mark-up language code;
identifies one or more first order exploits in the parsed mark-up language code; and
removes the one or more first order exploits identified; and
the second translation function:
parses the script code;
identifies one or more second order exploits in the parsed script code; and
inserts one or more checks configured to virtualize the one or more second order exploits identified at runtime execution by modifying statements and expressions in the script code; and
providing the transformed code to a client device that applies the first translation function to new mark-up language code during runtime execution based on the one or more checks inserted, and applies the second translation function to incoming script code during runtime execution based on the one or more checks inserted, to ensure runtime safety.

2. The method of claim 1, wherein the code comprises JavaScript™ code.

3. The method of claim 1, wherein the received code is stored and renamed to prevent access by an incoming script.

4. The method of claim 1, wherein inserting the one or more checks includes adding new scripts to a page to form a virtualization protection layer that will be executed when the page is loaded to the web browser application.

5. The method of claim 4, wherein the virtualization protection layer prevents manipulation of data contained in the page.

6. The method of claim 4, wherein the virtualization protection layer virtualizes reads and writes to HTML elements and script objects to prevent insertion of exploits into a page.

7. The method of claim 1, wherein transforming the code comprises checking a URL in the received code.

8. The method of claim 1, wherein transforming the code reduces time or demand on resources for implementation of a web browser protection module.

9. A device comprising:
a processor;
a memory, coupled to the processor, storing computer executable instructions that, when executed by the processor, configure the device to:
receive code executable by a web browser application or an email application on a target client device, the code including mark-up language code and script code;
prior to runtime execution, employ a first translation function and a second translation function to transform the code to ensure safe execution of the code by the web browser application or the email application, wherein:
the first translation function:
parses the mark-up language code;
identifies one or more first order exploits in the parsed mark-up language code; and
removes the one or more first order exploits identified; and
the second translation function:
parses the script code;
identifies one or more second order exploits in the parsed script code; and
inserts one or more checks configured to virtualize the one or more second order exploits identified at runtime execution by modifying statements and expressions in the script code; and
at runtime execution, apply the first translation function to new mark-up language code during runtime execution based on the one or more checks inserted, and apply the second translation function to incoming script code during runtime execution based on the one or more checks inserted, to ensure runtime safety; and
render for display the transformed code at the target client device.

10. The device of claim 9, wherein the transforming prevents misdirection of sensitive information in the code.

11. The device of claim 9, wherein the transforming prevents alteration of one or more visual indications displayable to a user by the target client device, wherein the one or more visual indications pertain to origin of the code.

12. One or more computer readable storage devices that comprise instructions executable by a processor to implement acts comprising:
receiving code via a network interface in response to a user request, the code being executable by a web browser application or an email application and including mark-up language code and script code;
prior to runtime execution, employing a first translation function and a second translation function to transform the code received via the network interface to prevent exploitation of vulnerabilities of the web browser application or the email application, wherein:
the first translation function:
parses the mark-up language code;
identifies one or more first order exploits in the parsed mark-up language code; and
removes the one or more first order exploits identified; and
the second translation function:
parses the script code;
identifies one or more second order exploits in the parsed script code; and
inserts one or more checks configured to virtualize the one or more second order exploits identified at runtime execution by modifying statements and expressions in the script code; and
at runtime execution, applying the first translation function to new mark-up language code during runtime execution based on the one or more checks inserted, and applying the second translation function to incoming script code during runtime execution based on the one or more checks inserted, to ensure runtime safety; and
rendering for display the transformed code.

13. The method of claim 1, further comprising:
learning exploitation techniques based on provided feedback; and
based on the provided feedback, updating a web browser protection module to address the learned exploitation techniques.

14. The method of claim 1, wherein the first and second translation functions and the inserted one or more checks cannot be written to, read from, or detected by the incoming script code during runtime execution.

15. The device of claim 9, wherein the first and second translation functions and the inserted one or more checks cannot be written to, read from, or detected by the incoming script code during runtime execution.

16. The one or more computer readable storage devices of claim 12, wherein the first and second translation functions and the inserted one or more checks cannot be written to, read from, or detected by the incoming script code during runtime execution.

* * * * *